United States Patent
Maass et al.

(10) Patent No.: US 9,752,930 B2
(45) Date of Patent: Sep. 5, 2017

(54) WRIST-WORN DEVICE FOR SENSING AMBIENT LIGHT INTENSITY

(71) Applicant: KONINKLIJKE PHILIPS N.V., Eindhoven (NL)

(72) Inventors: Henning Maass, Waalre (NL); Guido Josef Müsch, Erkelenz (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 143 days.

(21) Appl. No.: 14/647,842

(22) PCT Filed: Nov. 22, 2013

(86) PCT No.: PCT/IB2013/060322
§ 371 (c)(1),
(2) Date: May 28, 2015

(87) PCT Pub. No.: WO2014/091340
PCT Pub. Date: Jun. 19, 2014

(65) Prior Publication Data
US 2015/0346026 A1 Dec. 3, 2015

(51) Int. Cl.
*G01J 1/04* (2006.01)
*G01J 1/44* (2006.01)
*G01J 1/02* (2006.01)
*G01J 1/42* (2006.01)

(52) U.S. Cl.
CPC .............. *G01J 1/44* (2013.01); *G01J 1/0233* (2013.01); *G01J 1/0242* (2013.01); *G01J 1/0271* (2013.01); *G01J 1/0425* (2013.01); *G01J 1/4204* (2013.01); *G01J 1/4228* (2013.01)

(58) Field of Classification Search
CPC ...... G01J 1/0223; G01J 1/0425; G01J 1/4228; G01J 1/4204
See application file for complete search history.

(56) References Cited

U.S. PATENT DOCUMENTS

| | | | |
|---|---|---|---|
| 4,491,727 A | 1/1985 | Appelbaum et al. | |
| 4,975,584 A | 12/1990 | Benjamin et al. | |
| 2007/0035530 A1 | 2/2007 | Van Geest et al. | |
| 2007/0060807 A1 | 3/2007 | Oishi | |

(Continued)

FOREIGN PATENT DOCUMENTS

| CN | 1961201 A | 5/2007 |
|---|---|---|
| CN | 202284971 U | 6/2012 |

(Continued)

OTHER PUBLICATIONS

Terman et al, "Light Therapy for Seasonal and Nonseasonal Depression: Efficacy, Protocol, Safety, and Side Effects", CNS Spectrums, vol. 10, No. 8, Aug. 2005, pp. 647-663.

(Continued)

*Primary Examiner* — Tony Ko
(74) *Attorney, Agent, or Firm* — Michael W. Haas

(57) ABSTRACT

The invention relates to a wrist-worn device (10) for sensing ambient light intensity, comprising a plurality of light receivers arranged at different positions of the wrist-worn device (10) in different orientations to receive light from different directions (+X, −X; +Y, −Y; −Y; +Z, −Z).

18 Claims, 4 Drawing Sheets

(56) References Cited

U.S. PATENT DOCUMENTS

| 2008/0319354 A1* | 12/2008 | Bell .................. A61B 5/11 600/595 |
| 2010/0186817 A1 | 7/2010 | Chen et al. |
| 2012/0197097 A1 | 8/2012 | Chan et al. |

FOREIGN PATENT DOCUMENTS

| EP | 0930512 A1 | 7/1999 |
| WO | 0028290 A1 | 5/2000 |
| WO | WO2005121727 A1 | 12/2005 |
| WO | 2008154261 A1 | 12/2008 |
| WO | 2011089539 A1 | 7/2011 |
| WO | 2012073183 A1 | 6/2012 |

OTHER PUBLICATIONS

Philips Respironics, "Twice As Easy—Actigraphy Made Easy", Actigraphy Product Brochure, 2012, From http://actiwatch.respironics.com/, 4 Page Document.

Lockley et al, "Short-Wavelength Sensitivity for the Direct Effects of Light on Alertness, Vigilance, and the Waking Electroencephalogram in Humans", Sleep, vol. 29, No. 2, 2006, pp. 161-168.

\* cited by examiner

WRIST-WORN DEVICE FOR SENSING AMBIENT LIGHT INTENSITY

CROSS-REFERENCE TO PRIOR APPLICATIONS

This application is the U.S. National Phase application under 35 U.S.C. §371 of International Application No. PCT/IB2013/060322, filed on Nov. 22, 2013, which claims the benefit of U.S. Provisional Patent Application No. 61/737,165, filed on Dec. 14, 2012. These applications are hereby incorporated by reference herein.

FIELD OF THE INVENTION

The invention relates to the field of wrist-worn devices for sensing ambient light intensity, as well as to a corresponding method for sensing ambient light intensity using such a wrist-worn device.

BACKGROUND OF THE INVENTION

Exposure to light is the key mechanism that enables a proper synchronization of the body clock with the solar day cycle. Timing, duration, intensity and spectral composition of light exposure all have impact on the so-called entrainment of a person to a 24-hour circadian rhythm. It has been shown that restorative sleep can only occur in synchronicity with the body clock. For certain people who have a phase shift of their internal body clock relative to the social schedules around them, exposure to bright light at well-defined times can be used to shift their body clock forward or backwards to better align it with their social needs. Also for the treatment of seasonal affective disorder, timed and regular exposure to bright light is an effective means.

The assessment of light levels to which a person is exposed over the course of multiple days or even weeks is an important instrument for the diagnosis of mood and sleep disorders. Existing actigraphy products measure the activity and light exposure with a device that is used and worn similar to a wrist watch.

Such a wrist-worn device is shown, for example, in US 2008/0319354 A1, showing a system and method for monitoring information related to sleep. The wrist-worn device shown in this document comprises an illumination sensor to provide information related to the intensity of ambient illumination of the user. The signal of the sensor can be further processed by suitable electronic computing means.

The common sensor modules are usually mounted such that the axis of main sensitivity is orthogonal to the display surface of the operation module, i.e., orthogonal to the outer hand surface of the user. At the same time, the axis of main sensitivity of the sensor is completely independent from the direction of gaze of the user, with the consequence that there is no good correlation between the light levels being measured and those light levels present at the user's eyes which would be optimal for the estimation of the visual and non-visual effects caused by light exposure such as e.g., shifting human circadian phase. Furthermore, generally the main axis of sensitivity is different from the direction from which the main portion of ambient light is received. In most environments light is not being uniformly received from all directions, but the main exposure is caused by a small number of light sources (the sun, lighting on the ceiling, etc.). It follows from the above that using wrist-worn devices as described above not always leads to satisfactory results in sensing the ambient lighting and estimating its influence on the visual and non-visual effects as e.g., shifting human circadian phase.

SUMMARY OF THE INVENTION

It is therefore an object of the present invention to provide a wrist-worn device for sensing ambient light intensity that is improved with respect to the measurement of ambient lighting and its influence on a human being and that decreases or even eliminates the influence of a directional sensitivity of the sensor arrangement within the device.

This object is achieved by a wrist-worn device comprising the features of claim 1.

The wrist-worn device for sensing ambient light intensity according to the present invention comprises not only one but a plurality of light receivers arranged at different positions of the wrist-worn device in different orientations to receive light from different directions. In this arrangement the effect of a directional receptivity of one of the receivers is counterbalanced by different receivers pointing in different directions, so that a multi-directional measurement is possible. This leads to better results in estimating the ambient light intensity. With increasing number of light receivers used in this arrangement, a quasi omni-directional light measurement is possible, being almost independent from the present orientation of the wrist-worn device on the body of the user.

The light receiver might be a conventional light sensor that collects light and converts the received light intensity into a corresponding electric signal that can be further processed. In this case the receptivity of the light receiver corresponds to the sensitivity of a sensor. However, the light receiver can also be any optical device that collects light and further guides it to a sensor device for further processing.

According to one preferred embodiment of the present invention, each of the different directions corresponds to a main axis of maximum receptivity of one of the light receivers. This means that the receivers are oriented such that their axes of maximum receptivity lie in different spatial directions. In case of the use of sensors as light receivers, the maximum receptivity corresponds to the maximum sensitivity of the sensor on its main axis.

According to another preferred embodiment of the present invention, at least some of the different directions are orthogonal to each other. Just to give one example, one of the light receivers may be placed on top of the wrist-worn device, with its main axis of maximum receptivity standing orthogonal to the back of the hand of the user, while another light receiver is arranged laterally at the wrist-worn device, pointing in a direction orthogonal to the first light receiver.

According to another preferred embodiment, at least some of the different directions are opposite to each other. For example, two different light receivers can be arranged on opposite sides of the wrist-worn device.

According to still another embodiment of the present invention, the light receivers are arranged in pairs, wherein the two light receivers of each pair are arranged in opposite orientations on one spatial axis of a Cartesian coordinate system. For example, six light receivers can be used in total, with three pairs of light receivers on the spatial axes of a three dimensional coordinate system.

Preferably the wrist-worn device comprises an operation module and a wrist band connected with its ends to opposite sides of the operation module, and the light receivers are arranged in different positions on the operation module and/or the wrist band.

The operation module can be, for example, a housing receiving an integrated circuit for processing and storing the signals provided by sensors used as light receivers, comparable to the housing of a common wrist watch.

More preferably, the light receivers are sensors for generating a signal corresponding to the received light intensity.

According to still another embodiment of the present invention, the light receivers are connected via light conductors with one common sensor that collects the light received by the light receivers. In this case the light receivers themselves are not provided as sensors but only as optical light collecting devices, such as optical lenses, coupled to light conduction fibers that supply the collected light towards the sensor for further processing.

More preferably, the light receivers are provided to receive light of one or a plurality of spectral ranges, for example, within the visible light spectrum or also including the infrared or ultraviolet spectral range.

According to another preferred embodiment, the wrist-worn device according to the present invention further comprises a central processing unit for processing signals representing the intensities received by the light receivers and for identifying and further processing a signal representing a maximum intensity among these intensities. In this embodiment only the signal of the light receiver having received the maximum intensity among all receivers is further processed.

According to another preferred embodiment, the central processing unit is provided for identifying and further processing a signal representing the maximum intensity in one predetermined spectral range.

According to another embodiment of the present invention, the wrist-worn device comprises a central processing unit for processing signals representing the intensities received by the light receivers and for combining these signals to one general intensity signal. This combination can be achieved, for example, by adding all signals of the light receivers, or by any other linear or non-linear combination of them.

According to still another preferred embodiment, the wrist-worn device further comprises an accelerometer for sensing the spatial orientation of the of the wrist-worn device. The signal of the accelerometer can be used to identify, for example, the light receiver that points to the ground, or another light receiver that points to the ceiling or to the sky. This information can be used to enhance the overall sensing sensitivity from the spatial arrangement of the light receivers.

The invention also refers to a method for sensing ambient light intensity using a wrist-worn device of the above kind, comprising the steps of supplying signals representing the intensities received by the light receivers to the central processing unit, comparing the supplied signals, and identifying a signal representing the maximum intensity among the received intensities.

Another method for sensing ambient light intensity according to the present invention, using a wrist-worn device as mentioned above, comprises the steps of supplying signals representing the intensities received by the light receivers to central processing unit, and combining the supplying signals to one general intensity signal.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
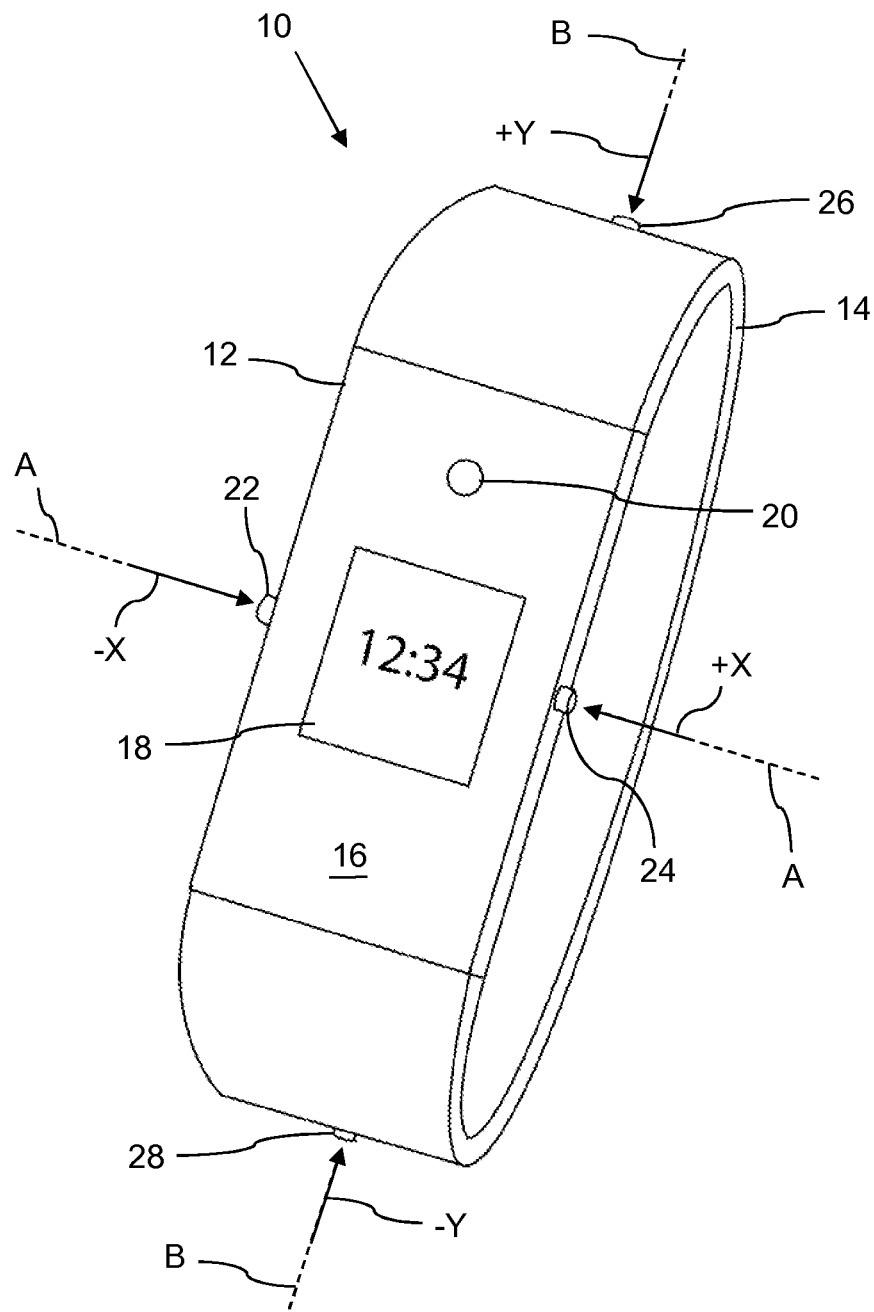
FIG. 1 is a perspective front view on one embodiment of a wrist-worn device according to the present invention.

FIG. 1 shows a wrist-worn device 10 for sensing the ambient light intensity in the environment of a user (not shown) wearing this device 10. Generally the wrist-worn device 10 comprises an operation module 12 in the shape of a flat rectangular box, and a flexible wrist band 14 that is attached with its ends to opposite sides of the operation module 12 such that the operation module 12 and the wrist band 14 form a ring. The inner diameter of the wrist band 14 is dimensioned such that the wrist-worn device 10 can comfortably be worn on the wrist of a user. For putting on the device 10, the wrist band 14 may have a certain elasticity to be widened, or a opening and closing mechanism (not shown in the Figures) may be provided for connecting one end of the wrist band 14 to the operation module 12. Generally the operation module 12 and the wrist band 14 are formed similar to a common wrist watch.

The operation module 12 is formed as a housing that receives an integrated electronic circuit for processing and storing electric signals, as will be described further below. On the top surface 16 of the operation module 12, there is a display 18 for displaying a status information of the device 10 or any other information, like, for example, the daytime.

Figure 2:
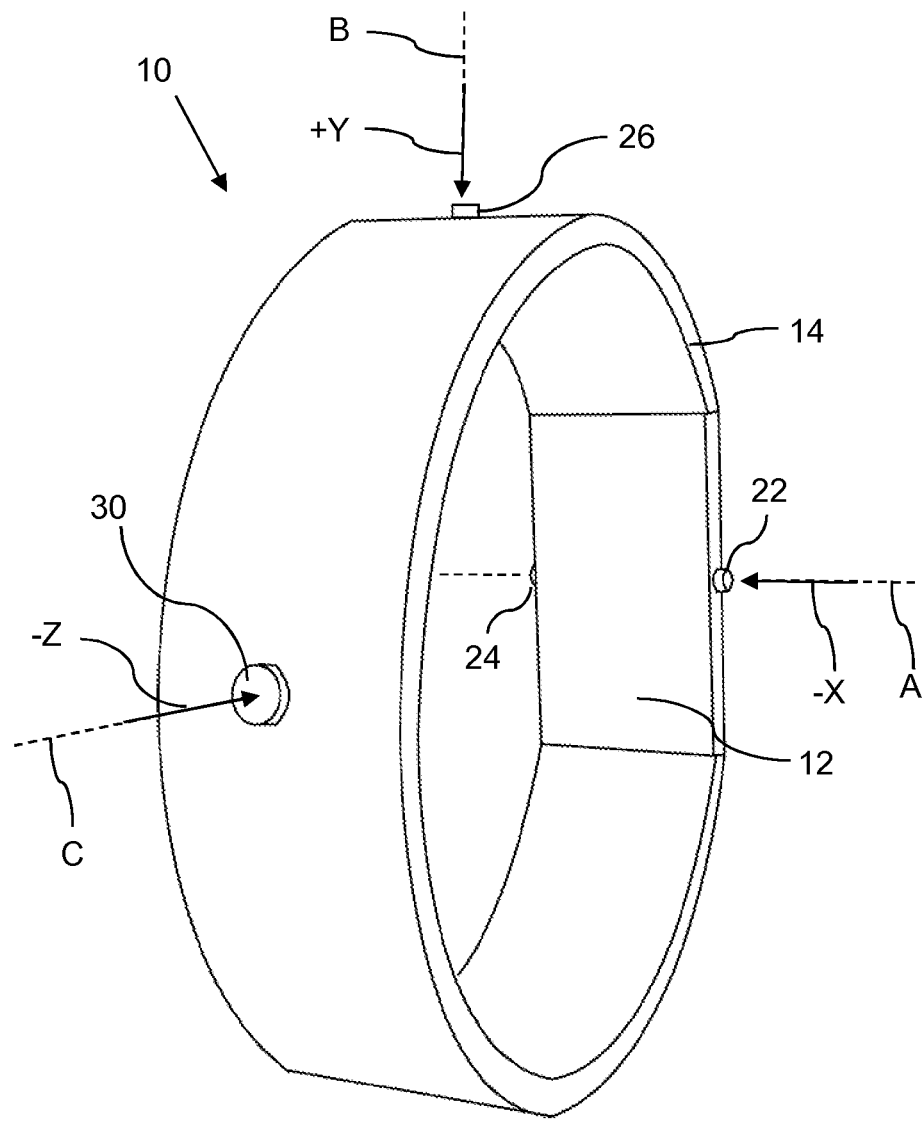
FIG. 2 is a perspective back view of the wrist-worn device shown in FIG. 1.
Figure 3:
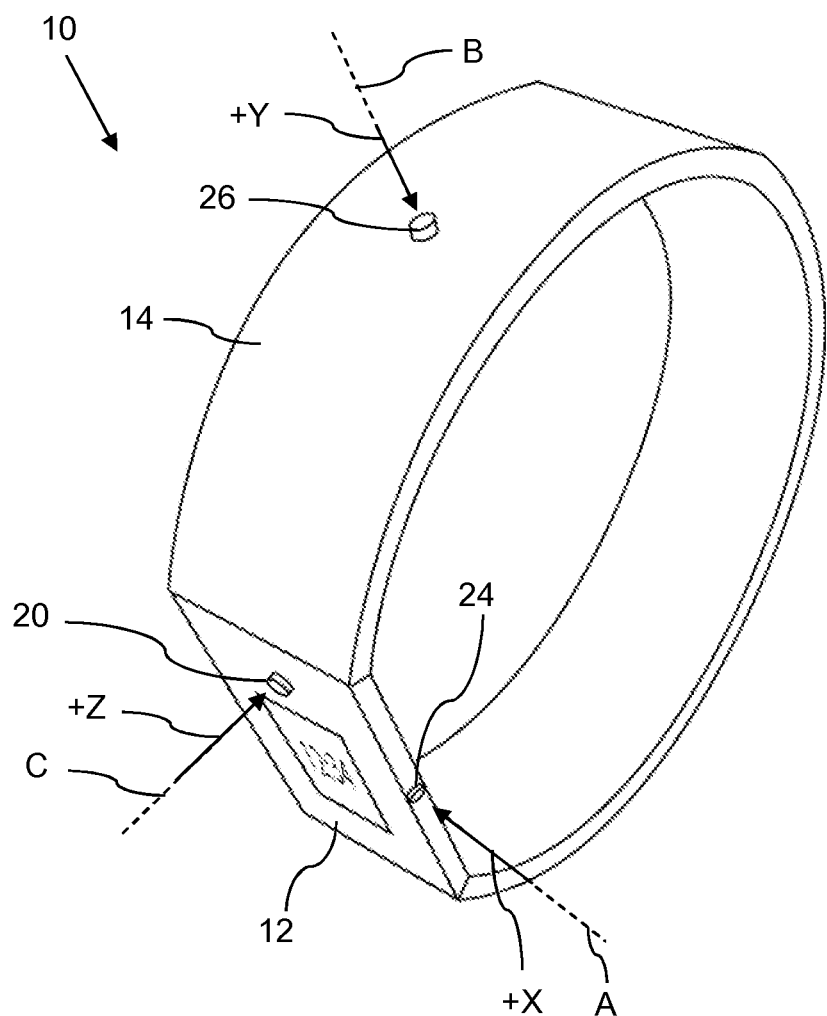
FIGS. 3 and 4 are a perspective top view and a perspective bottom view of the wrist-worn device of FIGS. 1 and 2.
Figure 4:
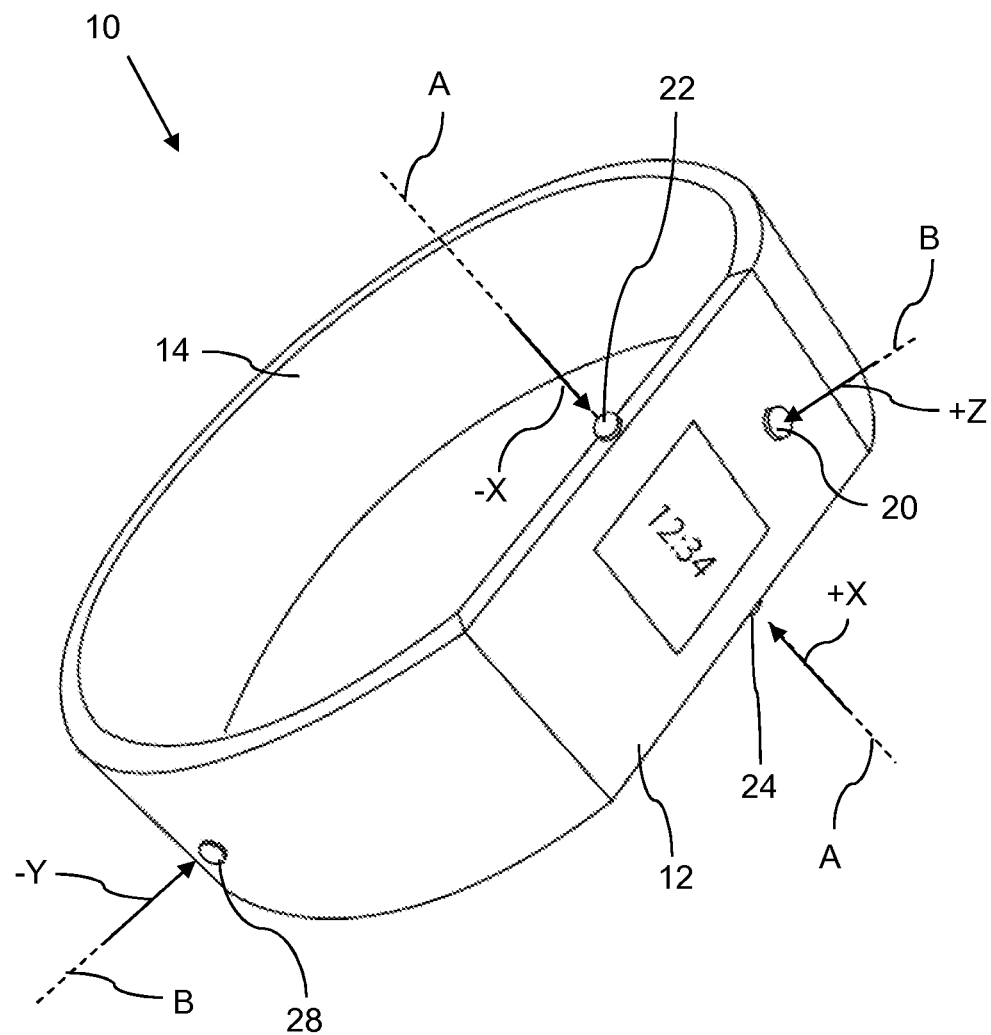

Further provided on the top surface 16 of the operation module 12 there is a light sensor 20 for measuring the ambient light intensity. Other sensors 22 and 24 are arranged laterally at the operation module 12, while another sensor 26 is arranged on top of the wrist band 14 (with respect to the orientation in FIG. 1), a fifth light sensor 28 is positioned opposite to the top sensor 26 on the bottom of the wrist band 14, and finally a sixth sensor (not shown in FIG. 1 but present in FIG. 2) is located on the back of the wrist band, opposite to the front sensor 20 on top of the operation module 12.

All sensors 20, 22, 24, 26, 28, 30 are arranged at different positions of the wrist-worn device 10 to receive light from different directions. Each of these directions corresponds to a main axis of maximum sensitivity of one of the sensors 20, 22, 24, 26, 28, 30. For example, the right sensor 24 on the right side of the operation module 12 is oriented such that it receives light from the right side in FIG. 1, and this sensor 24 has a main axis of maximum sensitivity marked by a dashed line A that stands perpendicular to the side wall of the operation module 12 and to the ring plane of the wrist band 14. In this axis A, the sensitivity of the sensor 24 is at its maximum. The sensor 24 is positioned to receive light from a direction +X (marked by an arrow in FIG. 1) along its main axis A.

The sensor 22 is arranged on the opposite lateral side of the operation module 12, with its main axis of maximum sensitivity falling together with the axis A of the sensor 24 described before. However, this left sensor 22 is arranged to receive light from the opposite direction −X (also marked by an arrow opposite to the arrow +X in FIG. 1) along this axis A. As a result, both opposite sensors 22 and 24 are opposite to each other, arranged to receive light from opposite directions +X, −X on a common axis A of maximum sensitivity.

The top sensor 26 and the bottom sensor 28 are also arranged opposite to each other to receive light from opposite directions. Namely, the top sensor 26 is arranged to receive light from a top direction +Y perpendicular to the surface of the wrist band 14, while the bottom sensor 28 is arranged to receive light from the opposite direction −Y, while the marked directions +Y, −Y both lie on the same main axis B representing the maximum sensitivity of the sensors 26 and 28. This second main axis B of sensitivity is marked by the dashed line in FIG. 1. It is noted that this second main axis B of maximum sensitivity stands perpendicular to the first main axis A of maximum sensitivity of the left and right sensors 22 and 24.

Finally the front sensor 20 on top of the operation module 12 and the back sensor 30 (FIG. 2) are opposite to each other to receive light from the opposite directions marked by arrows +Z, −Z. Each of these directions +Z, −Z lies on a main axis C of maximum sensitivity of the front and back sensors 20 and 30.

In the arrangement described above, each two light sensors of the six light sensors 20, 22, 24, 26, 28, 30 are arranged in pairs, wherein two light sensors of one pair are arranged in opposite orientations +X, −X, +Y, −Y, and +Z, −Z, respectively, on one spatial axis of a Cartesian coordinate system spanned by the orthogonal axes of these pairs. These orthogonal axes are represented by the described axes A, B, and C of maximum sensitivity of the sensors 20, 22, 24, 26, 28, 30. This further means that each two sensors are arranged orthogonal to each other, for example the left sensor 22 and the top sensor 26, the right sensor 24 and the bottom sensor 28, or the top sensor 26 and the back sensor 30, and so forth.

By this arrangement, it is possible to sense the ambient light intensity in a quasi omni-directional way, receiving light from all directions in the three dimensional space. By use of the signals of all sensors 20, 22, 24, 26, 28, 30, it is possible to strongly decrease or even eliminate the influence of a directional sensitivity of each of the sensors, i.e. light falling along the main axis A, B or C of maximum sensitivity of the respective sensor 20, 22, 24, 26, 28, 30 generates a stronger signal than light arriving with an incident angle with respect to the main axis of maximum sensitivity of the respective sensor. This effect can be minimized by the above described arrangement.

In the present example, sensors are used as light receivers to transform light into an electric signal that can be further processed and/or stored by a central processing unit in the operation module 12. In the present embodiment, the sensors 20, 22, 24, 26, 28, 30 are represented by opto-sensitive electronic components. However, it is possible to arrange other kinds of light receivers in place of the sensors 20, 22, 24, 26, 28, 30 at the same positions and with the same orientations, that also have a main axis of maximum receptivity for light, in form of optical elements that collect light and further supply the collected light via light conductors towards a common sensor that is housed within the operation module 12, so that the electric signal is generated by this common sensor. It is also possible that the light receivers (i.e., sensors or any other kinds of light collecting optical elements) are provided to receive light of one or a plurality of spectral ranges, for example, within the visible light spectrum or in the infrared or ultraviolet spectral area. The central processing unit may then process signals representing the intensities received by the light receivers and identify the signal that represents the maximum measured intensity, for further storing and/or processing. This means that the central processing unit decides which of the light receivers or sensors measures the maximum intensity, and further processes only the signals of this identified sensor. It is further possible to carry out this identification and further processing on one selected spectral range of the sensors.

Another possibility is to combine the signals of all light receivers or light sensors to one general intensity signal within the central processing unit, by any linear or non-linear combination. This processing can also be weighted by an accelerometer (not shown) that is provided within the operation module 12 for sensing the spatial orientation of the wrist-worn device 10. In this case it is possible to identify, for example, one sensor that points in an upward direction towards the sky or the room ceiling, and to use this identification or information for further processing of the signals representing the intensities of the sensors 20, 22, 24, 26, 28, 30.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A wrist-worn device for sensing ambient light intensity, comprising:
   a plurality of light receivers arranged at different positions of the wrist-worn device in different orientations to receive light from different directions, and facilitate measurement of light from angles which impact circadian rhythm;
   an operation module, the operation module including a housing; and
   a wristband connected to opposite sides of the operation module, wherein the plurality of light receivers are arranged in different positions on the operation module and the wristband.

2. The wrist-worn device according to claim 1, wherein each of the different directions corresponds to a main axis of maximum receptivity of one of the light receivers.

3. The wrist-worn device according to claim 1, wherein at least some of the different directions are orthogonal to each other.

4. The wrist-worn device according to claim 1, wherein at least some of the different directions are opposite to each other.

5. The wrist-worn device according to claim 1, wherein the plurality of light receivers are arranged in pairs, wherein the two light receivers of each pair are arranged in opposite orientations on one spatial axis of a Cartesian coordinate system.

6. The wrist-worn device according to claim 5, wherein the plurality of light receivers comprise a first light receiver disposed on a first surface of the operation module, the first surface of the operation module facing away from a wrist of a user, and a second light receiver disposed on a first surface of the wrist band, the first surface of the wrist band being opposite the first surface of the operation module and facing away from the wrist of the user.

7. The wrist-worn device according to claim 6, wherein the plurality of light receivers further comprise a third light receiver disposed on a second surface of the operation module, the second surface of the operation module being orthogonal to the first surface of the operation module, and a fourth light receiver disposed on a third surface of the operation module, the third surface of the operation module being parallel to the second surface of the operation module.

8. The wrist-worn device according to claim 7, wherein the plurality of light receivers further comprise a fifth light receiver disposed on a second surface of the wrist band, the second surface of the wrist band being orthogonal to the first surface of the wristband, and a sixth light receiver disposed on a third surface of the wrist band, the third surface of the wristband being parallel to the second surface of the wrist band, wherein the second surface of the wrist band and the third surface of the wrist band are facing away from the wrist of the user.

9. The wrist-worn device according to claim 1, wherein the plurality of light receivers are sensors for generating a signal corresponding to the received light intensity.

10. The wrist-worn device according to claim 1, wherein the plurality of light receivers are connected via light conductors with one common sensor that collects the light received by the light receivers.

11. The wrist-worn device according to claim 1, wherein the plurality of light receivers are provided to receive light of one or a plurality of spectral ranges.

12. The wrist-worn device according to claim 1, further comprising a central processing unit for processing signals representing the intensities received by the plurality of light receivers and for identifying and further processing a signal representing the maximum intensity among these intensities.

13. Method for sensing ambient light intensity using the wrist-worn device according to claim 12, comprising the following steps:
supplying signals representing the intensities received by the plurality of light receivers to the central processing unit,
comparing the supplied signals, and
identifying a signal representing the maximum intensity among the received intensities.

14. The wrist-worn device according to claim 1, wherein the central processing unit is provided for identifying and further processing a signal representing the maximum intensity in one predetermined spectral range.

15. The wrist-worn device according to claim 1, further comprising a central processing unit for processing signals representing the intensities received by the plurality of light receivers and for combining these signals to one general intensity signal.

16. Method for sensing ambient light intensity using the wrist-worn device according to claim 15, comprising the following steps:
supplying signals representing the intensities received by the plurality of light receivers to the central processing unit,
combining the supplied signals to one general intensity signal.

17. The system of claim 16, further comprising:
determining, via an accelerometer, orientations of the plurality of light receivers; and
weighting the supplied signals based on the determined orientations.

18. The wrist-worn device according to claim 1, further comprising an accelerometer for sensing the spatial orientation of the wrist-worn device.

* * * * *